J. Oadhoudt.
Corn Harvester.

No. 64,789.    Patented May 14, 1867.

Witnesses:
F. A. Jackson
Wm Trewin

Inventor:
Josiah Oadhoudt
Per Munn & Co.
Attorneys

United States Patent Office.

JOSIAH OADHOUDT, OF ST. ANTHONY'S FALLS, MINNESOTA.

Letters Patent No. 64,789, dated May 14, 1867.

IMPROVEMENT IN CORN-HARVESTERS.

*The Schedule referred to in these Letters Patent and making part of the same.*

TO ALL WHOM IT MAY CONCERN:

Be it known that I, JOSIAH OADHOUDT, of St. Anthony's Falls, in the county of Hennepin, and State of Minnesota, have invented a new and improved Corn-Harvester; and I do hereby declare that the following is a full, clear, and exact description thereof, which will enable others skilled in the art to make and use the same, reference being had to the accompanying drawings, forming part of this specification, in which—

Figure 1:
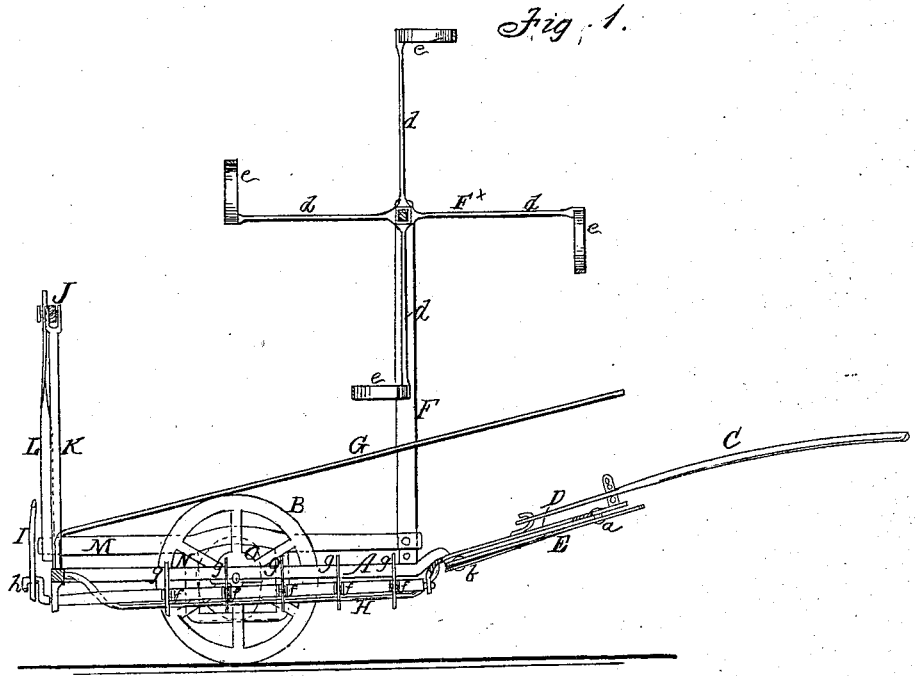
Figure 2:
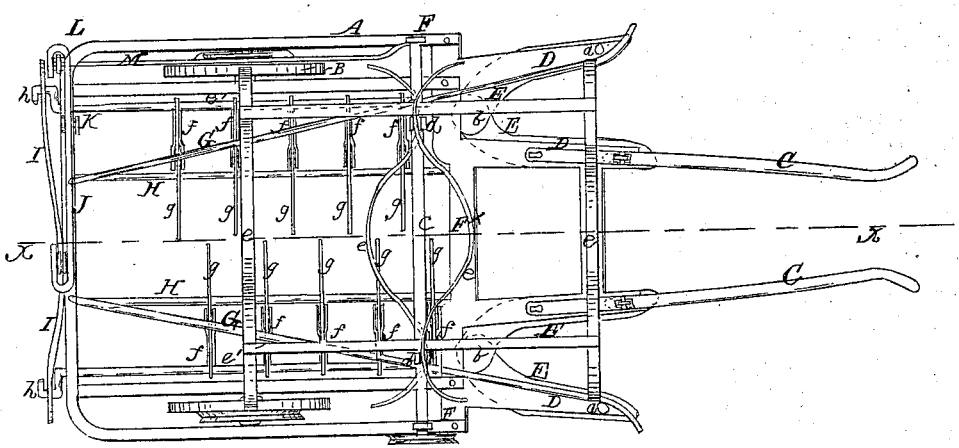

Figure 1 is a side sectional view of my invention taken in the line $x\ x$, fig. 2.

Figure 2, a plan or top view of the same.

Similar letters of reference indicate like parts.

This invention relates to a new and improved device for harvesting corn, that is, cutting down the standing stalks and depositing the same in proper-sized gavels upon the field.

The invention consists in the peculiar form of knives or cutters employed for cutting the corn, and also in an improved dropping or discharging mechanism, and in a peculiar reel for presenting the corn to the knives or cutters and discharging it upon the droppers, all arranged as hereinafter shown and described, whereby the desired work may be done very expeditiously and in a perfect manner.

A represents a rectangular frame, which is mounted on two wheels, B B, and has thills, C C, attached to it. To the front part of this frame A there are attached at each side two bars, D D, which slightly diverge from each other, from their inner to their outer ends, and to the under sides of each pair of bars D D there are attached cutters E E, the front ends of which are secured by rivets, $a$, to the front ends of the bars D D, and the inner ends connected by a rivet, $b$. The cutters E of each pair are disposed in the form of a V, as shown clearly in fig. 2. The cutters E are fixed or immovable, a pair being at each side of the thills, as shown in fig. 2. To each side of the frame A, near its front part, there is attached an upright, F, the upper ends of which form bearings for a shaft, $c$, of a reel, F*, which shaft is provided with radial arms $d$, connected at their ends by bars $e$, which are curved, the central parts of the bars $e$ being convex at their front or face sides, and the ends of said bars, at the points where they are attached to the arms $d$, being concave. To the rear part of the frame A there are attached two oblique bars, G G, which extend forward to the front end of frame A, the space between the front ends of said bars being greater than the space between the rear ends, as shown in fig. 2; and in the frame A there are placed longitudinally two bars $e'\ e'$, which have parallel arms, $f$, projecting from their inner sides, each arm $f$ having a bar, $g$, pivoted in it. The pivoted bars $g$ rest upon rods H, fitted longitudinally in the frame A, and the rear ends of the bars $e'\ e'$ are provided each with a crank, $h$, which are connected by bars I I to a lever, J, which is pivoted to the upper end of an upright, K, on the rear part of the frame A, the outer end of said lever being connected by a bar, L, with the rear end of a lever, M, the front end of which is pivoted to the left-hand reel support or upright F. This lever M is formed with a yoke, N, within which a cam, O, on one of the wheels, B, works. The reel F* is driven by a band from a pulley on the other wheel B. As the implement is drawn along, the cutters E E cut the standing stalks, the horse walking between the rows, and the cutters E being in line with and operating upon two adjoining rows. The reel F* presents the standing stalks to the cutters, and also throws them upon the pivoted bars $g$, the curved bars $e$ effecting that result, the oblique bars G G serving as guides for the severed or cut stalks. The pivoted bars $g$ are, at short intervals, tilted, so as to discharge the cut stalks; in consequence of the cam O acting upon lever M, the latter, through the medium of the bar L, lever J, bars I I, and cranks $h$ actuating the bars $g$, so that the stalks will be discharged at proper intervals upon the ground. The device is extremely simple and efficient, and will effect a great saving in time and labor.

Having thus described my invention, I claim as new, and desire to secure by Letters Patent—

The frame A, with its oblique guides G G, reel F*, constructed as set forth, cutters E E, attached to the bars D D, each side of the thills C C, and the pivoted arms $g\ g\ g$ for dropping the corn, when constructed, arranged, and operating in the manner substantially as and for the purposes herein specified.

JOSIAH OADHOUDT.

Witnesses:
L. C. SMITH,
DAN. M. DEMMON.